United States Patent Office 3,438,828
Patented Apr. 15, 1969

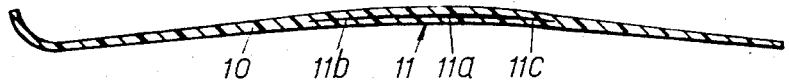
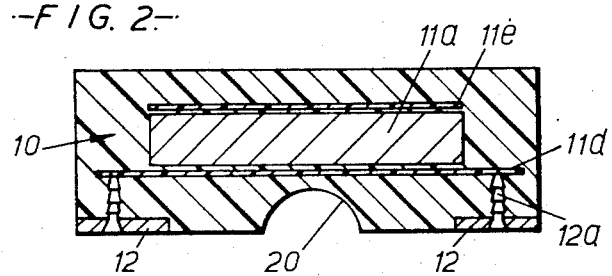
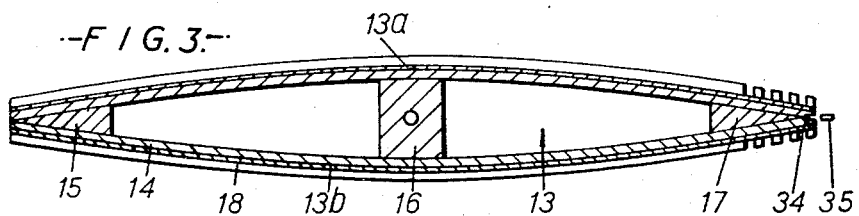
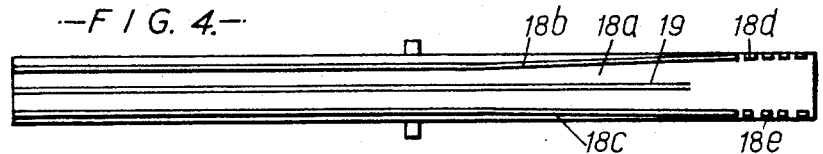

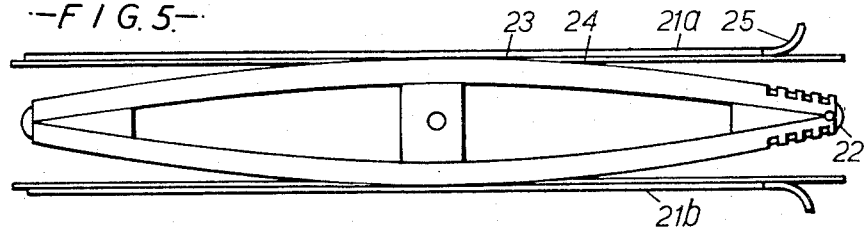
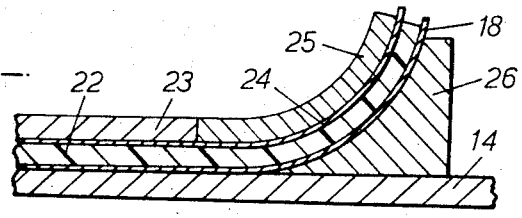
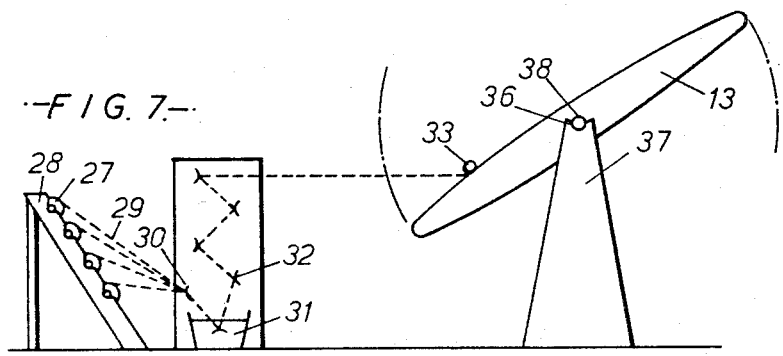

3,438,828
PROCESS FOR MAKING SKIS FROM PLASTICS REINFORCED WITH GLASS FIBERS
Odd Bjørnestad, Oldernesveien 16, Laksevag, near Bergen, Norway
Filed June 22, 1965, Ser. No. 465,872
Int. Cl. B31c 13/00
U.S. Cl. 156—171                     5 Claims

ABSTRACT OF THE DISCLOSURE

A process for making skis from plastic reinforced with glass fibers wherein plastic coated glass filaments are wound on mold elements in back to back relation; the mold elements being arranged for rotation during the winding operation, together with the application of pressure applying mold members to each of the mold elements to thereby form ski blanks joined at their opposite ends, followed by separation of the ski blanks, formation of the tip portion on each blank and hardening the plastic content of the blanks.

In producing skis from plastic reinforced with glass fibre, it has been previously proposed to utilise pre-hardened and stamped laminae thereof which are built up one upon the other with an intermediate lamina of non-hardened plastic which is hardened after final assembly of the ski blank.

It is an object of the present invention to provide a process involving less and simpler operations than the prior process.

It is another object of the invention to provide a process which involves a smaller consumption of the plastic material.

It is still another object of the invention to provide a process resulting in a glass fibre-reinforced plastic ski of greater strength than can be produced by the prior process.

According to the present invention a process of producing skis from glass fibre-reinforced plastic comprises coating continuous filaments of glass fibre with a hardenable plastic, applying the coated filaments substantially parallel to one another and in a direction longitudinally of a mould portion so as to form a layer of filaments arranged tightly side-by-side and one above the other subjecting said filaments to pressure by applying a second mould portion to the first mould portion, hardening the hardenable plastic and removing a ski blank from between said first and second mould portions.

Preferably at least one extra reinforcement layer is placed on top of a layer of the coated glass fibre filaments having a selected thickness and prior to building up the filament layer to its final thickness.

While it is possible to manufacture a ski using a glass fibre-reinforced plastic layer containing above 80 percent by weight of glass fibre, an amount of from about 50 to about 75 percent has proved to be most convenient, since then a sufficient degree of "outward movement" of the plastic material is ensured thereby enabling smooth and even outer surfaces to be produced on the ski.

It will be appreciated that skis produced according to the process of the invention can be either composite skis, namely skis made from glass fibre-reinforced plastic together with a separately produced core ply or homogeneous skis in which the skis are composed substantially of glass fibre-reinforced plastic.

In order that the invention can be more readily understood, convenient modes of carrying out the process of the invention will now be described, by way of example, with reference to the accompanying drawings in which:

FIG. 1 is a vertical section of a ski produced in accordance with the invention, FIG. 2 is a transverse vertical section through the ski of FIG. 1, FIG. 3 is a vertical section of mould portions used in the process of the invention, FIG. 4 is a plan of a mould portion as shown in FIG. 3, FIG. 5 is a side view of the mould portions with associated pressure-applying mould portions forming two distinct moulds, FIG. 6 is a scrap section showing an assembly for forming a ski tip, and FIG. 7 is a schematic view of an apparatus for use in carrying out the process of the invention.

In the following instance the main material consists of continuous filaments of glass fibre which are embedded in or are coated with a hardening plastic. The hardening plastic in the present instance consists of an epoxy resin to which are added catalysts. The main material is made up by winding up a bundle of glass fibre filaments which are coated with hardening plastic. Each bundle can consist of up to 20 individual filaments (rovings), preferably from 5 to 10 individual filaments. Each individual filament can consist of, for example, 60 so-called "ends" which again contain up to 240 continuous individual fibres. By the expression "continuous glass fibre filaments" shall also be understood bands of continuous glass mutually woven together. In order to obtain an effect corresponding to such woven bands there can be inserted laterally outwardly extending stable fibres between the individual fibres so as to obtain lateral bonds between the individual filaments.

In FIG. 1, there is shown a composite ski 10 which is provided at the centre with a separately produced core ply 11. In the example illustrated, the core ply is made from a central portion 11a of wood for fixing fastenings for the ski bindings (not shown) together with end portions 11b, 11c of plastic, metal or like material forming a cavity, which are rigidly connected together and which are tapered towards their free ends. On the outer sides, that is to say at the bottom and at the top of the core ply respectively, there are located glass fibre sheets 11d, 11e impregnated with finally non-hardened hardening plastic. The sheet 11d at the bottom of the core ply can be extended laterally outwards towards the outer edges of the ski and longitudinally towards the ends of the ski. The sheet 11e at the top of the core ply can be terminated approximately level with the core ply in the lateral direction but otherwise can be extended correspondingly to the sheet 11d towards the ends of the ski.

In FIG. 2 the central location of the core ply in the main material is illustrated. In addition steel edges 12 are illustrated having locating pins 12a which are completely embedded in the main material of the ski.

In FIG. 3 there is illustrated a lower mould 13 consisting of two end-to-end adjacent mould portions 13a and 13b, for the simultaneous production of two or a pair of skis 10. By manufacturing a pair of skis by one and the same process, it can be ensured that they are produced under similar conditions and thereby can exhibit substantially corresponding characteristics in use.

The lower mould 13 consists of two elongated frame portions 14 which are reinforced relatively to each other by intermediate web-forming elements 15, 16, 17 which maintain the frame portions outwardly stretched in opposed convex arcs which correspond to an intentional, conventional "spring" in the skis which are to be produced. On the frame portion there are arranged mould-forming metal plates 18 having a central surface 18a and side surfaces 18b, 18c which extend substantially the whole of the length of the skis' longitudinal direction. On the portion of the lower mould which is to form the skis' upwardly curved ski tip the plates bear only loosely against the frame portion 14. The side edge surfaces are terminated at the ski tip-forming portion and are replaced by toothed side edge boundaries 18d, 18e which can permit a bending of the plate 18 at the forward portion of the ski blank. Along the centre of the plate 18 there extends a ridge 19 forming a central groove 20 on the bottom side of the ski as shown in FIG. 2.

In FIG. 5 there is shown the double lower mould 13 having two associated upper moulds 21a, 21b which between them form two blank skis 22 which are produced in one piece and which hang together at the ends. The upper moulds consist of a flexibly yielding metal plate 23 and a flexibly yielding moulding frame 24. In front the moulding frame carries a rigid frame end portion 25 which together with a corresponding, separate frame end portion 26 (FIG. 6) is adapted to form the ski tip for the associated ski after the ski blanks are divided at the associated end of the lower mould. It is also possible to discard the separate frame from end portion 26 by fastening in a suitable manner the outer end of the plate 18a to the frame end portion 25 or the like. The division of the ski blanks at their single adjacent end can be carried out after the upper moulds 21a, 21b are clamped into position on the ski blanks right up to the ski tip-forming portion.

In FIGURE 7 there is illustrated an apparatus for producing ski blanks 22 according to the invention. On storage rolls 27 in a frame 28, glass fibre filaments 29 are wound which are led over guide loops 30 in a bunch down into the vessel 31 containing liquid epoxy resin and from there in a zig-zag path over scrapers 32 which are located above the vessel 31 and further over a filament guide 33 directly against the lower mould 13, where the bunch of filaments is secured in a slot 34 by means of a wedge 35 (FIG. 3). After the mould 13 is treated internally with a suitable greasing agent and a suitable thick layer of hardened or non-hardened hardening plastic or thermoplastic, the plastic-coated bunch of glass fibre filaments is wound directly up on to the lower mould. By means of the thread guide 33, it is ensured that the glass fibre filaments are positioned tightly by the side of one another and above one another to form a tight jointly packed underlayer. The winding up of the glass fibre filaments on the lower mould can be accomplished by turning the mould in a rotating bearing 36 in a frame 37 by means of rotating spindles 38. When a suitably thick underlayer is built up the first glass fibre sheet 11d is placed in position and thereafter the core ply 11a–11c and finally the next glass fibre sheet is placed in position. After this the glass fibres are wound up to full height in the mould and the upper portions 21a, 21b of the mould are set in position. The upper portions of the mould are set first against the centre of the ski blanks on the lower portion of the mould and are afterwards pressed against the ski blanks from the centre and in both directions outwards towards the ends. In this way, there is achieved a pressing out of the plastic and possibly air bubbles trapped in the main mass towards the ends of the ski. After the ski blanks are divided at their one ski tip-forming end, the frame end portions 26 are inserted below the forward end of the plate 18a so that the ski tip is formed between the frame end portion 26 and the frame end portion 25. When the ski blanks are secured in this manner between the lower mould and the upper mould by means of fixing means (not shown), this unit is raised out of the frame 37 and is inserted in a heating cabinet for hardening the non-hardened hardening plastic. When the ski blanks are finally hardened the ski blanks are divided at their still connected ends and can be removed from the mould. The rounding off of the forward portion of the ski tip and the finishing of the end portion of the ski can be effected afterwards in a suitable apparatus (not shown) and finally on these finished portions of the ski can be applied caps known per se at the top of the ski and the rear end edge of the ski respectively.

What I claim is:

1. A process of producing laminated skis from glass fibre-reinforced plastic which comprises coating continuous filaments of glass fibre with a hardenable plastic, winding the coated filaments substantially parallel to one another on to a pair of rotatably mounted mould portions by turning the latter, said rotatable mould portions being curved convexly outwards and arranged back-to-back with their ends adjacent and said filaments being wound in a direction longitudinally of said mould portions to form individual layers of selected thickness, the filaments being arranged tightly side-by-side and one above the other, placing at least one extra reinforcement layer on top of each filament layer, winding on further coated filaments in the aforesaid manner to build up said layers of filaments further to a final thickness, causing a corresponding one of a pair of pressure-applying mould portions to subject each of the layers of filaments on the rotatably mounted moulds to pressure from the centre of the convex moulding surface outwards towards the ends thereby forming two ski blanks joined at their ends, separating the ski blanks at one end, forming the ski tips at the free ends of said blanks, transferring said ski blanks while still between the mould portions to a heating cabinet to harden the hardenable plastic, separating said ski blanks at their other connected end and removing said ski blanks from between the two pairs of mould portions.

2. A process according to claim 1, wherein the glass fibre-reinforced layers contain from between about 50 to about 75 percent by weight of glass fibre.

3. A process according to claim 1, wherein the extra reinforcement layer is selected from a sheet of glass fibre filaments mutually woven together and a sheet of glass fibre filaments having staple fibres extending outwardly from the main direction of the filaments so as to form a transverse reinforcement for the latter, said sheet being impregnated with a hardenable plastic.

4. A process according to claim 3, wherein a core ply is located centrally of the ski blank and between lower and upper extra reinforcement layers which both extend longitudinally towards the ends of the ski blank, said lower reinforcement layer extending laterally towards the outer edges of the ski blank while said upper reinforcement layer terminates inside said lower reinforcement layer, having approximately the same lateral dimensions as the core ply.

5. A process according to claim 4, wherein the core ply has a central portion of wood and longitudinally tapering end portions of another material secured thereto.

References Cited

UNITED STATES PATENTS

| 1,335,105 | 3/1920 | Frederick | 156—184 |
| 2,448,114 | 8/1948 | Olson et al. | 156—189 |
| 2,552,124 | 5/1951 | Tallmann | 161—59 XR |
| 2,749,266 | 6/1956 | Eldred | 156—175 XR |
| 3,142,598 | 7/1964 | Rosen | 156—174 XR |
| 3,258,795 | 7/1966 | Mailhot | 280—11.13 XR |

EARL M. BERGERT, *Primary Examiner.*

M. E. McCAMISH, *Assistant Examiner.*

U.S. Cl. X.R.

156—173; 280—11.13